Figure 1:
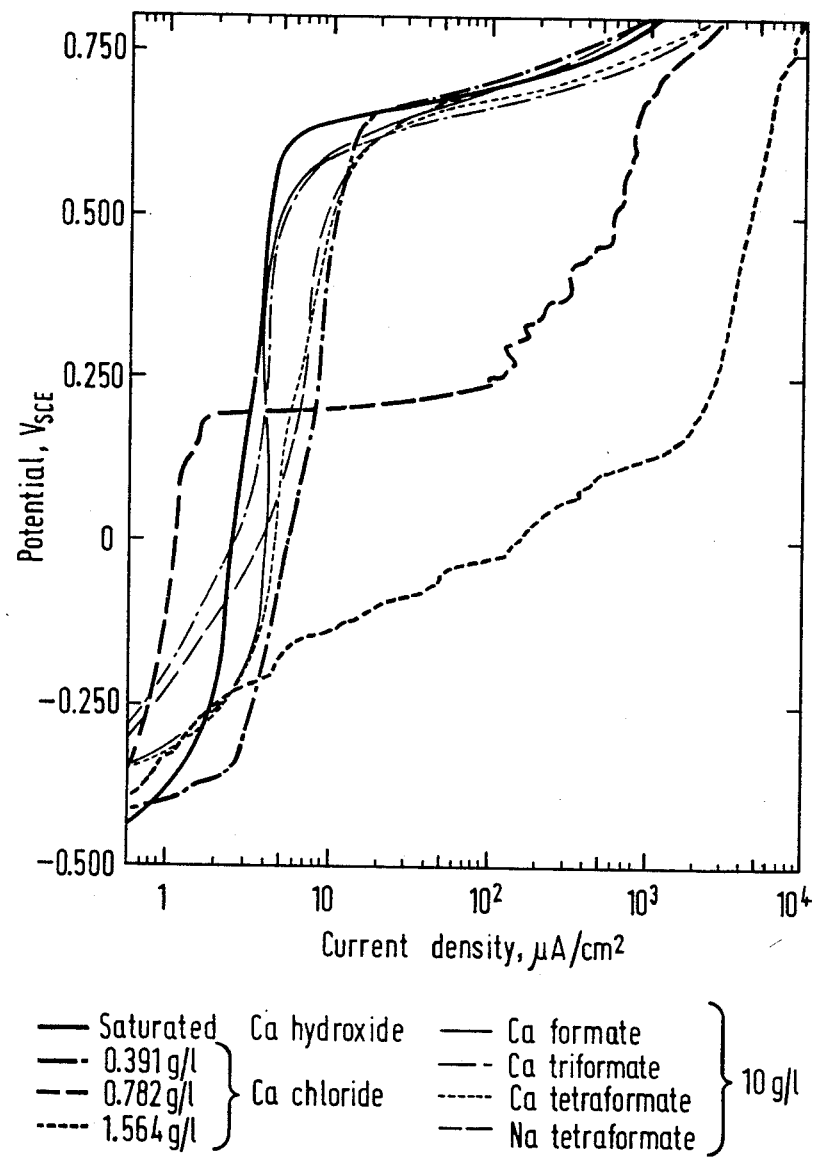

United States Patent [19]

Berry et al.

[11] 4,261,755
[45] Apr. 14, 1981

[54] ACID FORMATES FOR USE AS SETTING AND EARLY STRENGTH DEVELOPMENT ACCELERATORS IN CEMENTITIOUS COMPOSITIONS

[75] Inventors: David Berry, Keyingham; Brian D. Black, Willerby; Peter Kirby, Beverley, all of England

[73] Assignee: BP Chemicals Limited, London, England

[21] Appl. No.: 91,746

[22] Filed: Nov. 6, 1979

[30] Foreign Application Priority Data

Nov. 15, 1978 [GB] United Kingdom ............... 44643/78

[51] Int. Cl.³ ............................................. C04B 7/35
[52] U.S. Cl. ........................................ 106/90; 106/315
[58] Field of Search ............................. 106/90, 315

[56] References Cited

U.S. PATENT DOCUMENTS

| | | | |
|---|---|---|---|
| 3,210,207 | 10/1965 | Dodson et al. | 106/315 |
| 3,619,221 | 11/1971 | Kossivas | 106/90 |
| 3,801,338 | 4/1974 | Whitaker | 106/315 |
| 4,116,706 | 9/1978 | Previte | 106/315 |
| 4,191,584 | 3/1980 | Berry | 106/315 |

*Primary Examiner*—James Poer
*Attorney, Agent, or Firm*—Brooks, Haidt, Haffner & Delahunty

[57] ABSTRACT

This invention relates to the use of sodium, calcium and ammonium salts of formic acid as early strength developers and setting accelerators in hydraulic cements, concretes, mortars and plasters. The salts used are acidic salts containing between 1.5 and 5 moles of the formate ion per mole of the cation. These salts have much greater solubility and are more effective than the corresponding calcium salts, particularly under low temperature conditions.

10 Claims, 1 Drawing Figure

ACID FORMATES FOR USE AS SETTING AND EARLY STRENGTH DEVELOPMENT ACCELERATORS IN CEMENTITIOUS COMPOSITIONS

The present invention relates to cementitious compositions which contain an accelerating admixture for the setting and early strength development thereof and which is less corrosive to steel in reinforced concrete than conventional chloride based additives.

In the building industry several types of cementitious bases are used. The types include the generic class of "hydraulic cements", concrete mixes containing such cements admixed with a fine aggregate, eg sand, and a coarse aggregate, and mortars and plasters. The last two in the list are mixtures of hydrated lime, sand and water. By far the most important of these are the hydraulic cements which include Portland cement, aluminous cements, sulphate resistant cements, slag cements (blast furnace slags formed in the production of iron by reaction of limestone with silica, alumina and other components present in the ore and in the ash from the coke), and expansive cements (which expand slightly during the first few days of hydration so that the concrete never shrinks below the dimensions it had on removal of the formwork and which contain a mixture of ground sulphoaluminate clinker and Portland cement clinker).

Hydraulic cements are defined as those cements that are capable of setting and hardening by the interaction of water with the constituents of the cement. Portland cement is an example of a class of hydraulic cements and is comprised essentially of calcium silicate. A common Portland cement comprises tricalcium silicate and dicalcium silicate, and a lesser amount of tricalcium aluminate and tetracalcium aluminoferrite. When mixed with water, Portland cement sets in a few hours and hardens over a period of weeks. The initial setting is caused by the interaction of water and the tricalcium aluminate. The subsequent hardening and development of cohesive strength result from the interaction of water and the tricalcium silicate. Both interactions are accompanied by the separation of a gelatinous hydrated product, which surrounds and binds the individual particles together.

Hydration of cement is a chemical change which is dependent on temperature. Since ambient temperatures vary continually, an effective means of controlling the hydration rate is essential to the production of high quality concrete. This is particularly important in the preparation and use of concrete during winter when accelerated hydration is required to develop early strength, and for the prevention of the damaging effects of low temperatures. Accelerated setting is also desirable in the production of prefabricated concrete shapes to facilitate quick release from the moulds and in the production of ready mix concrete.

External heating has been suggested as a means of early hydration. A more general practice is the addition of an accelerator such as calcium chloride to the cementitious composition. Calcium chloride has the advantage of low cost and is an effective accelerator for setting and early strength development in such compositions. However, it is used with reluctance in applications where the cementitious composition is in contact with metal, such as in reinforced and pre-stressed concrete, because of its corrosive effect on steel re-inforcements particularly in structures of high porosity. In view of this, legislation is proposed in the UK, and is in force in some European countries, against the use of such accelerators. Neutral calcium formate has been used as a chloride-free and less corrosive alternative to calcium chloride, especially when used in conjunction with a corrosion inhibitor. However, a major disadvantage of neutral calcium formate is its low water solubility (16 grams per 100 grams of water, 14% w/w) which often restricts its use to a powder form. Solubility is an important factor since the uniformity of distribution of the accelerator within the cementitious composition is essential if uneven setting and consequent development of stresses in the resultant structures is to be avoided.

This problem has been overcome by the use of calcium acid formates as claimed and described in our copending British Pat. No. 1,551,656.

It has now been found that the solubility of such additives and the setting performance can be improved by using other acid formates.

Accordingly, the present invention is a cementitious composition comprising (a) a cementitious base selected from a hydraulic cement and concrete mixes containing the cement, mortars and plasters, and (b) an accelerating admixture which is an acid formate of a cation selected from ammonium, sodium and potassium ions in which the molar ratio of cation to the formate anion is between 1:1.5 and 1:5.

According to a further embodiment the present invention is a process for preparing improved cementitious compositions comprising adding to a cementitious base selected from a hydraulic cement and concrete mixes containing the cement, mortars and plasters, an aqueous solution of an acid formate of a cation selected from ammonium, sodium and potassium ions in which the molar ratio of the cation to the formate anion is between 1:1.5 and 1:5.

The acid formates as herein defined are acidic salts in contrast to the neutral calcium formate. Acidic salts of this type are claimed and described in our British Pat. No. 1,505,388. Thus, examples of acid formates which may be used in the cementitious compositions of the present invention include the di-, tri-, tetra- and penta-formates of each of sodium, potassium and ammonium cations whereby the molar ratio of cations to anions in each acid formate respectively is 1:2, 1:3, 1:4, and 1:5 and mixtures thereof.

The acid formates may be formed by reacting excess formic acid with the respective cation hydroxide, carbonate or bicarbonate. Thus, sodium tetraformate may be formed by reacting aqueous formic acid (85% w/w, 4 moles) with aqueous sodium hydroxide (47% w/w, 1 mole) to produce an aqueous solution. This solution can be conveniently prepared at an acid formate concentration of over 68% by weight although the solubility of these acid formates in water is even higher. This solubility is vastly superior to the solubility of either calcium tetraformate (approximately 22% by weight which is equivalent to a solubility of 27.5 grams of calcium tetraformate per 100 grams of water), or calcium formate (approximately 14% by weight). A solution of the acid formate of similar strength can also be prepared by addition of aqueous formic acid (3 moles) to aqueous sodium formate (1 mole).

The acid formates of the present invention when added to the cementitious composition reduce the viscosity of the mix. This is a very useful asset particularly if compositions of low viscosity are desired. Furthermore, this characteristc affords the choice of reducing the amount of water used in preparing such compositions thus improving acceleration.

The amount of acid formate added to the cementitious composition may vary between 0.2% and 5% by weight preferably between 0.2 and 3.5% of the dry cementitious base in the composition. The acid formate is suitably added as an aqueous solution to the water used in the mixing process the amount of water used depending upon the desired viscosity of the composition. Acid formates may be added to the cementitious composition alone or in admixture with other neutral or acid formates. In particular, the acid formates of the present invention when used in conjunction with the calcium acid formates described in our British Pat. No. 1,551,656 show remarkable early setting properties, especially under low temperature conditions. For example, a mixture of sodium tetraformate (cation: formate molar ratio 1:4) and calcium tetraformate (cation: formate molar ratio, 1:4) when used as setting accelerator for a concrete mix at 0°–2° C. to simulate winter conditions gave after 24 hours a compressive strength superior to that achieved when either of these was used alone and was comparable to a calcium chloride containing concrete without the corrosive deficiencies of the latter.

The acid formates in the compositions of the present invention are preferably used as an aqueous solution because the high solubility of these acid formates enables a more uniform distribution of the additive within the composition. The concepts of solubility and uniform distribution are relevant even if these acid formates are added as solids, since water is always added to the compositions at some stage and calcium formate has a tendency to precipitate when used alone, thus affecting the strength of the structures. A particularly significant advantage of the accelerating admixtures of the present invention is that, unlike calcium formate, an accidental overdosage of this admixture does not seriously affect accelerating performance to the detriment of the consequent structure.

The cementitious compositions of the present invention may contain one or more of the other conventional additives in addition to the acid formates. For example they may contain agents for protection against corrosion and frost; concrete liquefying agents; surfactants or wetting agents; auxiliary inert materials such as porous fillers, fibres and pigments; hydraulic binders; heat and sound insulating agents; synthetic resins and reinforcing agents; and sand.

The invention is further illustrated with reference to the following Examples.

EXAMPLE

In the example which follows compressive strengths were measured on a concrete containing one part by weight Portland Cement and 4.5 parts by weight of an aggregate comprising 34% by weight of sand, 23% by weight of 10 mm gravel, and 43% by weight of 20 mm gravel. The average ratio of water to cement used was 0.47:1, giving nominal slump of 50 mm. The additives were added to the concrete mix as aqueous solutions.

The concrete test mixes were poured into moulds to provide 100 mm test cubes. The test cubes were stored in a curing tank and the compressive strengths measured at intervals of 24 hours 2 days, 3 days and 7 days.

Concretes containing calcium chloride, calcium formate, and various concentrations of sodium tetraformate were tested. The mean compressive strengths are presented in Table I below together with the result obtained for concrete containing no additive. The concentration of additive is expressed as percentage by weight of neutral or acid salt based on the weight of dry cement, eg 1.5% of sodium tetraformate represents an addition of 2.2% w/w of 68.5% w/w sodium tetraformate solution.

TABLE I

| Additive | Concentration of Salt or Acid Salt (% w/w of dry cement) | Compressive Strength N/mm$^2$ | | | |
|---|---|---|---|---|---|
| | | 24 hours | 2 days | 3 days | 7 days |
| None | | 13.8 | 28.0 | 33.4 | 45.8 |
| Calcium Chloride | 1.5 | 21.6 | 33.0 | 37.2 | 46.0 |
| Calcium Formate | 1.5 | 16.0 | 28.8 | 33.6 | 45.2 |
| Sodium Tetraformate | 1.5 | 17.0 | 30.4 | 35.0 | 45.0 |
| " | 1.0 | 16.7 | 28.0 | 33.0 | 43.6 |
| " | 0.5 | 14.3 | 29.0 | 35.6 | 45.8 |

As can be seen from the results in Table I, on a w/w basis, the compressive strength of concretes produced using 1% sodium tetraformate is equivalent in performance to 1.5% calcium formate.

In addition, the data shown in Table II indicates that by employing tetraformates of the present invention as the accelerating admixtures, the dosage volumes are almost reduced to one-fourth of the values for calcium tetraformate. This reduced dosage volume and the higher solubility of the claimed acid formates not only result in savings in terms of reduced packaging, handling and transportation costs but also in the actual amount of the acid formate deployed.

TABLE II

COMPARATIVE ASSESSMENT OF CALCIUM TETRAFORMATE* AND SODIUM TETRAFORMATE

| | Calcium Tetraformate* | Sodium Tetraformate |
|---|---|---|
| Solution Strength | 21.5% | 68% |
| Specific Gravity | 1.1 | 1.3 |
| Dosage Rate | 1% active ingredient weight on cement 2.11 litre/50 kg cement | 1% active ingredient weight on cement 0.57 litre/50 kg cement |

*Comparative Tests

EXAMPLES 2–5

In the following Examples compressive strengths were measured on concrete containing one part by weight Ordinary Portland Cement and 4.5 parts by weight of an aggregate comprising 34% by weight of sand, 23% weight of 10 mm gravel, and 43% by weight of 20 mm gravel. The average ratio of water to cement used was 0.47:1, giving a nominal slump of 50 mm. The accelerators were added to the concrete mix as aqueous solutions.

The concrete test mixes were poured into moulds to provide 100 mm test cubes. The test cubes were stored in a curing tank and the compressive strengths measured at intervals from 16 hours up to 7 or or 28 days.

The concentration of accelerator is expressed as percentage by weight of neutral or acid salt based on the weight of dry cement, eg 1.5% of sodium tetraformate represents an addition of 2.2% w/w of 68.5% w/w sodium tetraformate solution.

EXAMPLE 2

In this Example concretes prepared at ambient temperature containing calcium chloride, calcium formate, and various concentrations of sodium tetraformate were tested. The mean compressive strengths expressed as a percentage of the strength of the concrete containing no accelerator (control sample) are presented in Table III below.

TABLE III

|  | Compressive Strength as % of Control | | | | | |
| --- | --- | --- | --- | --- | --- | --- |
|  | 16 hrs | 24 hrs | 48 hrs | 72 hrs | 7 days | 28 days |
| 1.5% CaCl₂ | 266 | 157 | 118 | 111 | 100 | 100 |
| 1.5% Ca Formate | 175 | 116 | 103 | 101 | 99 | 95 |
| 1.5% Sodium Tetraformate | 200 | 123 | 106 | 105 | 99 | 96 |
| 1.0% Sodium Tetraformate | 173 | 121 | 102 | 99 | 96 | 91 |
| 0.5% Sodium Tetraformate | 57 | 104 | 101 | 107 | 100 | 101 |
| 3.0% Sodium Tetraformate | 120 | 104 | 104 | 110 | 101 | 99 |

These results show that the acceleration in compressive strength is as good using 1.0% sodium tetraformate as is achieved using 1.5% of calcium formate. Even when a triple overdose (3.0% addition) of sodium tetraformate is used no adverse effect on compressive strength is observed. This is an important safeguard where accelerators are used by unskilled site labour.

EXAMPLE 3

In this example the test concretes were prepared at 0°-2° C., to simulate winter conditions, and contained calcium chloride, calcium formate, sodium diformate, sodium tetraformate, and a mixed sodium/calcium tetraformate containing equimolar amounts of sodium tetraformate and calcium tetraformate. The mean compressive strengths are again expressed as a percentage of the strength of the concrete containing no additive and are presented in Table IV below:

TABLE IV

| Accelerator | Actual formate ion content (%) based on dry weight of cement | Compressive Strength as % of Control | | | | |
| --- | --- | --- | --- | --- | --- | --- |
|  |  | 16 hours | 24 hours | 48 hours | 72 hours | 7 days |
| 1.5% CaCl₂* | — | 1600 | 638 | 184 | 119 | 100 |
| 1.5% CaFormate* | 1.04 | 550 | 350 | 140 | 98 | 103 |
| 1.0% Sodium Diformate | 0.79 | 300 | 450 | 186 | 128 | 122 |
| 1.0% Sodium Tetraformate | 0.87 | 200 | 250 | 148 | 111 | 114 |
| 1.0% Sodium/Calcium Tetraformate | 0.85 | 300 | 650 | 176 | 124 | 123 |
| 1.0% Calcium Tetraformate* | 0.81 | 200 | 238 | 115 | 79 | 93 |

*Comparative Tests: (Not according to the invention)

These results indicate that the acceleration in compressive strength using 1.0% sodium diformate and 1.0% of sodium tetraformate, at 0°-2° C., is of the same order as is achieved using 1.5% of calcium formate. The mixed sodium/calcium tetraformate gave a compressive strength comparable even to the calcium chloride containing concrete, after 24 hours, which is evidence of the possible advantage of using a mixed sodium/calcium acid formate in concrete prepared at winter temperatures.

CORROSION TESTS

EXAMPLE 4

The effect of sodium tetraformate on corrosion of steel reinforcements used in concrete was assessed electrochemically. Reinforcing steel (to specification BS.4483:1969) was potentio-dynamically polarised in saturated calcium hydroxide solutions containing calcium chloride, calcium formate, sodium tetraformate and two of the acid calcium formates described in our British Pat. No. 1,551,656.

The electrodes used were 6 mm diameter steel rods (to BS.4483:1969) 25 cm long, with one end ground down to 5 mm diameter for a length of approximately 1 cm. Each ground end was wet polished down to 600 grit and the rest of the rod marked using Interprinol bitumen paint. Calcium hydroxide was used as the supporting electrolyte since this approximates to that existing in the pores of moist Ordinary Portland Cement Concrete.

The steel electrodes were potentio-dynamically polarised from their rest potential ($E_R$) after 5 minutes' immersion in solution to a potential of 0.8 V (SCE). This was achieved via a potentiostat, using a voltage scan generator, and the potential/logarithm of current recorded directly on an X-Y recorder. In every case the scan rate was 50 mV/min, at room temperature and in quiescent solutions. The potentio-dynamic polarisation curves obtained are shown in FIG. 1.

It can be seen that sodium tetraformate, calcium formate, calcium triformate, and calcium tetraformate supported normal passive/transpassive behaviour of reinforcing steel in saturated calcium hydroxide solution, when present at a concentration of 10g per liter, but calcium chloride caused pitting to occur at concentrations >0.782 g per liter (500 ppm Cl⁻). (The initiation of pitting is characterised by a rapid increase in current density if propagation occurs). These results suggest that sodium tetraformate at levels greatly in excess of 1.5% by weight of cement may be added to concrete made from Ordinary Portland Cement with no deleterious effects on the reinforcement.

EXAMPLE 5

In this Example the corrosivity of mortar containing sodium tetraformate was assessed qualitatively. Polished and degreased lead-free mild steel rods (⅜ inch O.D.) were set in moulds containing mortar prepared from Ordinary Portland Cement to give specimens of 1 inch O.D. The specimens were placed in a cabinet maintained at 90–95% relative humidity and 33° C. After a period of three months the mortar was broken open and the rods examined. The specimens containing calcium formate, (1.5% on weight of dry cement), sodium tetraformate (1.5%), and no additive (control) showed no evidence of accelerated corrosion whereas the rod from the specimen containing calcium chloride (1.5%) showed severe pitting.

We claim:

1. A cementitious composition comprising (a) a cementitious base selected from a hydraulic cement and concrete mixes containing the cement, mortars and plasters, and (b) an accelerating admixture which is an acid formate of a cation selected from ammonium, sodium and potassium ions in which the molar ratio of cation to the formate anion is between 1:1.5 and 1:5.

2. A process for preparing improved cementitious compositions comprising adding to a cementitious base selected from a hydraulic cement and concrete mixes containing the cement, mortars and plasters, an aqueous solution of an acid formate of a cation selected from ammonium, sodium and potassium ions in which the molar ratio of the cation to the formate anion is between 1:1.5 and 1:5.

3. A cementitious composition according to claim 1 wherein the amount of the acid formate in the composition is between 0.2 and 5% by weight of the dry cementitious base.

4. A cementitious composition according to claim 3 wherein the amount of the acid formate in the composition is between 0.2 and 3.5% by weight of the dry cementitious base.

5. A composition according to anyone of the preceding claims wherein the acid formate in the accelerating admixture is selected from di-, tri-, tetra- and penta formates of sodium, potassium or ammonium cations.

6. A composition according to claim 1 wherein the accelerating admixture contains in addition an acid formate of calcium.

7. A composition according to claim 6 wherein the accelerating admixture comprises a mixture of sodium tetraformate and calcium tetraformate.

8. A composition according to claim 7 wherein the mixture is an equimolar mixture of sodium tetraformate calcium tetraformate.

9. A process according to claim 2 wherein the accelerating admixture is added to water used during the preparation of a cement mix from a cementitious base.

10. A process for producing improved cementitious compositions according to claim 1 wherein a solid formate is added to the cementitious base prior to the addition of water.

* * * * *

UNITED STATES PATENT AND TRADEMARK OFFICE
CERTIFICATE OF CORRECTION

PATENT NO. : 4,261,755

DATED : April 14, 1981

INVENTOR(S) : David Berry, Brian D. Black and Peter Kirby

It is certified that error appears in the above-identified patent and that said Letters Patent are hereby corrected as shown below:

Col. 8, line 17, before "calcium tetraformate", insert --and--.

Signed and Sealed this

Fourth Day of August 1981

[SEAL]

Attest:

GERALD J. MOSSINGHOFF

Attesting Officer     Commissioner of Patents and Trademarks